(12) United States Patent
Suchey

(10) Patent No.: US 8,376,662 B2
(45) Date of Patent: Feb. 19, 2013

(54) DYNAMIC BLOWER SYSTEM, AND METHODS OF CONSTRUCTING AND UTILIZING SAME

(76) Inventor: Robert John Suchey, Vanderbilt, MI (US)

( * ) Notice: Subject to any disclaimer, the term of this patent is extended or adjusted under 35 U.S.C. 154(b) by 477 days.

(21) Appl. No.: 12/693,840

(22) Filed: Jan. 26, 2010

(65) Prior Publication Data
US 2010/0129164 A1    May 27, 2010

Related U.S. Application Data

(63) Continuation-in-part of application No. 11/763,012, filed on Jun. 14, 2007, now abandoned.

(60) Provisional application No. 60/804,895, filed on Jun. 15, 2006.

(51) Int. Cl.
*B65G 51/16*      (2006.01)

(52) U.S. Cl. .......................................... 406/14; 406/137

(58) Field of Classification Search .................. 406/134, 406/136, 138, 137, 14
See application file for complete search history.

(56) References Cited

U.S. PATENT DOCUMENTS

| | | | | |
|---|---|---|---|---|
| 3,305,140 A | * | 2/1967 | Johnson | 406/24 |
| 3,346,305 A | * | 10/1967 | Heymann | 406/137 |
| 4,035,029 A | * | 7/1977 | Lindstrom et al. | 406/137 |
| 4,229,125 A | * | 10/1980 | Lindstrom | 406/137 |

\* cited by examiner

*Primary Examiner* — Gene Crawford
*Assistant Examiner* — William R Harp
(74) *Attorney, Agent, or Firm* — Weiner & Burt, P.C.; Irving M. Weiner; Pamela S. Burt

(57) ABSTRACT

A dynamic blower system to apply shredded aluminum foil on top of existing building insulation, including: a tank into which the foil is loaded; an air input port connected with the tank to generate an air vortex in the tank; an output hose connected with an outlet port of the tank; and an internal output louver connected with the tank and positioned relative to the vortex to direct the spinning foil into and through the outlet port and output hose.

6 Claims, 2 Drawing Sheets

DYNAMIC BLOWER SYSTEM, AND METHODS OF CONSTRUCTING AND UTILIZING SAME

CROSS-REFERENCE TO RELATED APPLICATIONS

The present application is a continuation-in-part of U.S. patent application Ser. No. 11/763,012 filed Jun. 14, 2007, now abandoned which claims priority from and is a continuation-in-part of U.S. Provisional Patent Application Ser. No. 60/804,895 filed Jun. 15, 2006, the entire contents of which applications are incorporated herein by reference thereto.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates generally to a novel and unique dynamic blower system, and methods of constructing and utilizing same.

More particularly, the present invention relates to a dynamic blower system for applying a shredded foil radiant barrier including means for minimizing damage to the blowable radiant media, and methods of constructing and using same.

The prior, but not necessarily relevant, art is exemplified by: Palmquist et al. U.S. Pat. No. 3,591,400; Tung U.S. Pat. No. 3,802,944; Hardesty U.S. Pat. No. 4,776,142; Hebert et al. U.S. Pat. No. 6,892,909; Liou U.S. Pat. No. 6,916,149; and Gerber U.S. Pat. No. 6,964,543.

It is a desideratum of the present invention to avoid the animadversions of the prior art and conventional apparatuses and systems, and to provide a novel and unique easy-to-use dynamic blower system.

BRIEF SUMMARY OF THE INVENTION

The present invention provides a dynamic blower system for applying shredded aluminum foil or other blowable radiant media on top of existing building insulation to form a non-flammable, fully-breathable radiant reflective barrier which reflects heat away from the insulation in summer, reflects heat back to the insulation in winter preventing heat from escaping, allows moisture to pass therethrough, and does not cause any condensation problem, comprising: a tank into which the blowable radiant media may be loaded; said tank having a shape of a surface of revolution; said tank having a central axis of rotation of said surface of revolution; an air input port interconnected with said tank for directing a stream of air to generate an air vortex in said tank, which air vortex causes said blowable radiant media to enter and spin with said vortex; an output hose operably interconnected with an outlet port of said tank; an internal output louver operably interconnected with said tank and positioned relative to said vortex to direct the spinning material into and through said outlet port and said output hose to enable a user to apply said blowable radiant media where desired; and first means for minimizing damage to said blowable radiant media, for minimizing contact of said blowable radiant media with rigid members or anything else, and for minimizing the time said blowable radiant media spends in said tank from said air input port to said outlet port of said tank.

The present invention also provides a system as described above, wherein the first means includes a high volume/low pressure arrangement of a large diameter air input port and a large diameter output hose.

The present invention also provides a system as described above, wherein the first means includes placement of said air input port and the entrance of said internal louver less than 180 degrees apart in the direction of the air vortex.

The present invention also provides a system as described above, wherein the first means includes a high volume air blower.

The present invention also provides a system as described above, including: a loading chute connected to and communicating with the interior said tank for loading said blowable radiant media into said tank; said loading chute having a shape of a surface of revolution; said loading chute having a central axis of rotation of its associated surface of revolution; said loading chute being connected to said tank in a predetermined configuration whereby said central axis of rotation of said loading chute intersects said axis of rotation of said tank obliquely; said loading chute being provided with a hinged lid and a latch; said hinged lid having a viewing port therein enabling a user to determine if re-filling of said blowable radiant media into said tank is required; said loading chute being connected to said tank at said surface of revolution of said tank near a first end of said tank; a kickstand for supporting said tank; and said kickstand being connected to said tank at said surface of revolution of said tank near said first end of said tank.

The present invention also provides a system as described above, including: a selectively movable air directing device operably connected with said air input port for controlling the direction the stream of air enters said tank to generate the air vortex in said tank; and side members on said internal output louver; and wherein: said internal output louver is oriented in said tank so that its entrance mouth is directed downwardly; said internal output louver having a first edge portion which is disposed substantially parallel to said central axis of rotation of said surface of revolution of said tank; and said first means includes an extreme tilt of said tank whereby the air vortex and gravity enables said blowable radiant media to spend a very short time in said tank.

It is an object of the present invention to provide a dynamic blower system as described and illustrated hereinbelow which will easily fit or pass through any door in a home or commercial building.

Another object of the present invention is to provide a blower system which can apply shredded aluminum foil, radiant barrier, or any other media on top of existing attic insulation, which foil, barrier, or other media, reflects heat away from said insulation in summer, reflects heat back to said insulation in winter preventing heat from escaping, and will allow moisture to pass therethrough.

Another object is to provide a system wherein the tank is used at an extreme tilt with a kickstand wherein the swirl and gravity in conjunction with other components and their configuration and placement allows the foil to spend a very short time in the tank.

Another object is to provide a system that eliminates damage to the shredded foil, which otherwise is subject to becoming aluminum pellets that are not useful as a radiant barrier.

Another object is to provide a system which minimizes obstructions to the foil to prevent the foil from striking unnecessary baffles and/or barriers.

Other objects, advantages, features and modifications of the present invention will become more apparent to those persons skilled in this particular area of technology and to other persons after having been exposed to the present patent specification with its accompanying drawings.

DETAILED DESCRIPTION OF THE INVENTION

Figure 1:
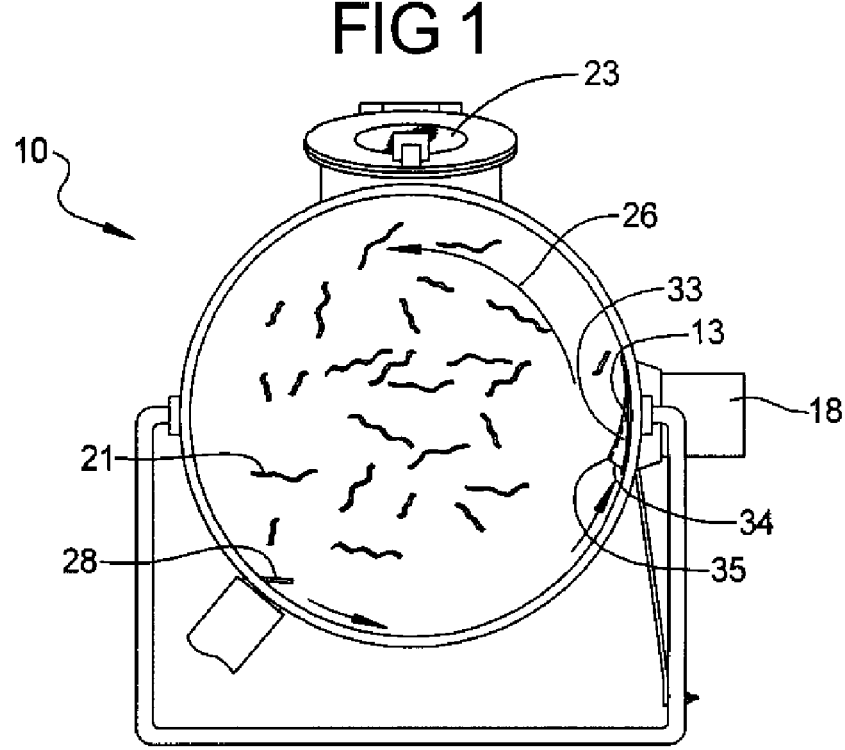
FIG. 1 shows a front elevational view, partly in section, of an embodiment of the invention.
Figure 2:
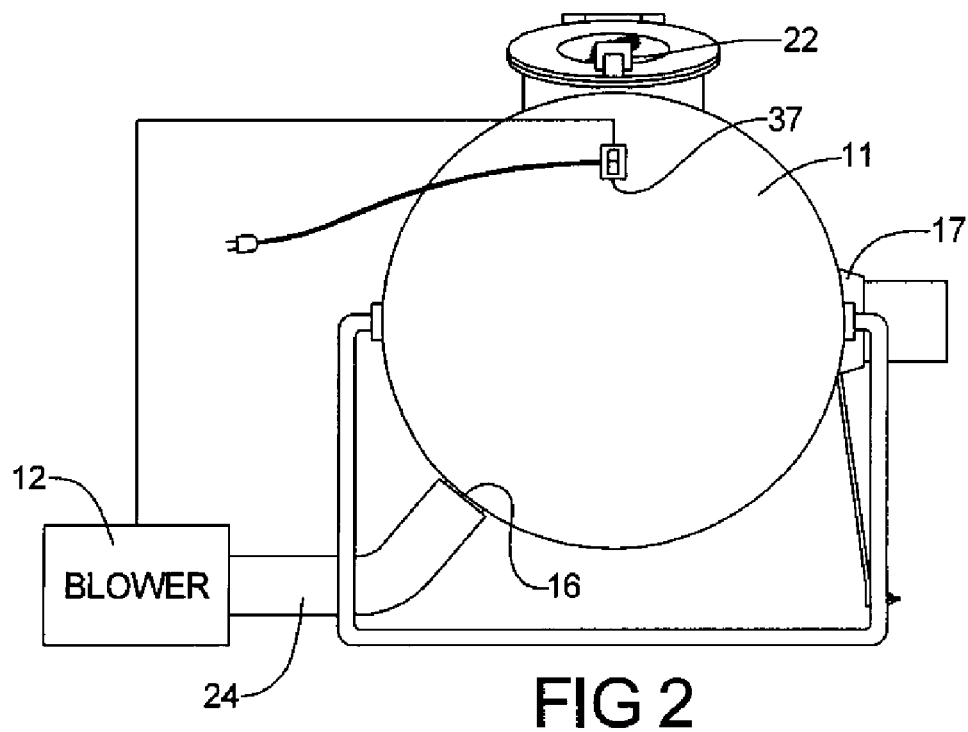
FIG. 2 is a front elevational view showing additional components of the system.
Figure 3:
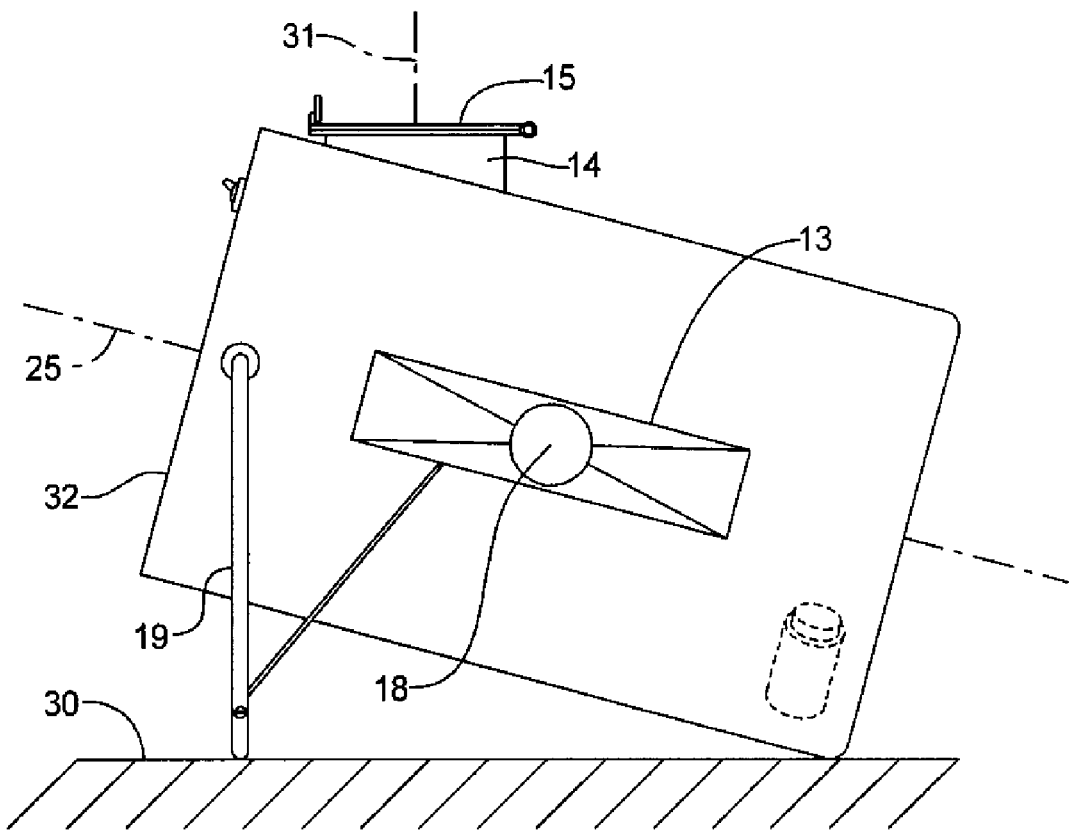
FIG. 3 is a side elevational view of the FIG. 1 embodiment.

With reference to the drawings, there is shown a dynamic blower system 10 in accordance with only one possible embodiment of the present invention.

The system 10 includes a tank 11, a high-flow blower 12, media scoop or internal output louver 13, a loading chute 14 with a hinged lid 15, an air input port 16, an outlet port 17, an output hose 18, a folding kickstand 19, and first means for minimizing damage to the blowable radiant media 21, for minimizing contact of the blowable radiant media 21 with obstacles, and for minimizing the time the blowable radiant media 21 spends in the tank 11 from the air input port 16 to the outlet port 17 of the tank 11.

Media 21 to be blown and/or applied is loaded into the tank 11 via the loading chute 14.

Preferably, but not necessarily, the media may take the form of shredded aluminum foil 21 as shown in FIG. 1.

The hinged lid 15 serves to prevent foil 21 from being blown out of the loading chute 14, and includes a latch cam lock 22 and a viewing port 23.

The viewing port 23 enables the user to determine if re-filling of the tank 11 is needed.

The shredded foil 21 is in an uncased raw form, and thus it is imperative that it be quickly expelled from the tank 11 and through the output hose 18 with minimum contact with anything. Accordingly, the system 10 uses a high-volume air blower 12, large diameter hoses 18 and 24 (e.g., at least 2½" diameters) and ports 16 and 17, a large dimensioned output scoop 13 (e.g., 3"×18") and outlet port 17, and very short time in the system 10.

The system 10 eliminates as many obstacles as possible, with only gravity and air volume to do the work.

Without these features, the raw uncased shredded aluminum radiant media 21 would be transformed into aluminum BBs or pellets which are useless for a radiant barrier.

The first means includes one or more of the following features: a) a high-volume/low pressure arrangement of a large diameter air input port 16 and a large diameter output hose 18; b) placement of said air input port 16 and the entrance of the internal louver 13 less than 180 degrees apart in the direction of the air vortex 26; and/or c) a high-volume air blower 12.

Figure 4:
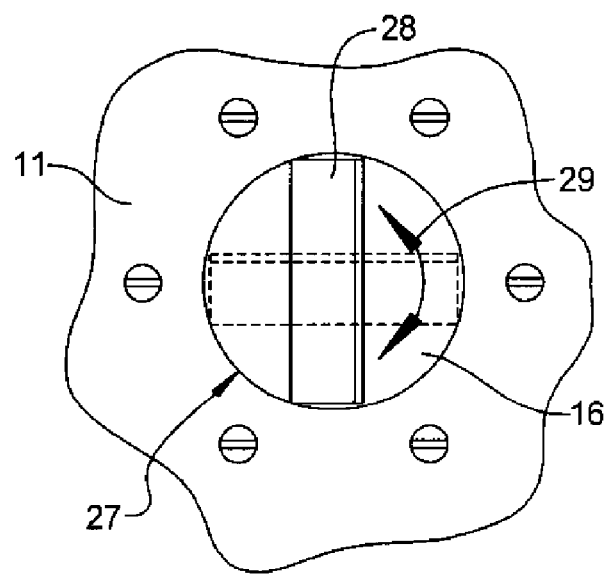
FIG. 4 is a fragmentary view of the selectively movable air directing device operably connected with the air input port.

FIG. 4 is a fragmentary view taken in the interior of the tank 11 of the selectively movable air directing device 27 operably connected with the air input port 16. With the device 27, the air input director 28 can be selectively moved into various positions as shown by the double-headed arrow 29.

The present invention provides a dynamic blower system 10 for applying shredded aluminum foil or other blowable radiant media 21 on top of existing building insulation to form a non-flammable, fully-breathable radiant reflective barrier which reflects heat away from the insulation in summer, reflects heat back to the insulation in winter preventing heat from escaping, allows moisture to pass therethrough, and does not cause any condensation problem, comprising: the tank 11 into which the blowable radiant media 21 may be loaded via chute 14; the tank 11 having a shape of a surface of revolution; the tank 11 having a central axis of rotation 25 of said surface of revolution; the air input port 16 interconnected with tank 11 for directing a stream of air to generate an air vortex 26 in tank 11, which air vortex 26 causes the blowable radiant media 21 to enter and spin with vortex 26; the output hose 18 operably interconnected with outlet port 17 of tank 11; an internal output louver 13 operably interconnected with tank 11 and positioned relative to the vortex 26 to direct the spinning material 21 into and through outlet port 17 and output hose 18 to enable a user to apply the blowable radiant media 21 where desired; and first means for minimizing damage to the blowable radiant media 21, for minimizing contact of blowable radiant media 21 with anything, and for minimizing the time the blowable radiant media 21 spends in tank 11 from air input port 16 to outlet port 17.

The system 10 is best used with the tank 11 in an extreme tilt position, i.e., the axis 25 of the tank 11 forming an acute angle the horizontal ground surface 30.

The present invention also provides a system 10 as described above, including: a loading chute 14 connected to and communicating with the interior of tank 11 for loading blowable radiant media 21 into tank 11; the loading chute 14 having a shape of a surface of revolution; the loading chute 14 having a central axis of rotation 31 of its associated surface of revolution; the loading chute 14 being connected to tank 11 in a predetermined configuration whereby the central axis of rotation 31 of loading chute 14 intersects the axis of rotation 25 of tank 11 obliquely; the loading chute 14 being provided with a hinged lid 15 and the latch cam lock 22; the hinged lid 15 having viewing port 23 therein enabling a user to determine if re-filling of blowable radiant media 21 into tank 11 is required; the loading chute 14 being connected to tank 11 at the surface of revolution of tank 11 near a first end 32 of said tank 11; the folding kickstand 19 for supporting tank 11 at any desired angle; and kickstand 19 being connected to tank 11 at the surface of revolution of tank 11 near the first end 32 of tank 11.

The present invention also provides a system 10 as described above, including: the selectively movable air directing device 27 operably connected with air input port 16 for controlling the direction the stream of air enters tank 11 to generate air vortex 26; and side members 33 on internal output louver 13; and wherein: internal output louver 13 is oriented in tank 11 so that its entrance mouth 34 is directed downwardly; internal output louver 13 having a first edge portion 35 which is disposed substantially parallel to the central axis of rotation 25 of the surface of revolution of tank 11; and the first means 10 includes an extreme tilt of tank 11 whereby the air vortex 26 and gravity enables the blowable radiant media 21 to spend a very short time or a minimum time in tank 11.

The hi-flow blower unit 12 directs a stream of air into the tank 11 via the air input port 16 and the selectively movable air directing device 27 operably connected with air input port 16 for controlling the direction the stream of air enters tank 11 to generate the air vortex 26 in tank 11. A bower control switch 37 is provided.

The kickstand 18 allows the tank 11 to be tilted during operation.

Preferably, but not necessarily, the kickstand latch device 19 may be provided with a pivot connection to tank 11, and a hook which can hook over a wing nut on the kickstand 19.

The system 10 permits the user to easily, quickly, and very conveniently apply a shredded foil radiant barrier to not-so-readily-accessible areas, such as, an attic.

The radiant barrier, which can be placed on top of existing home insulation, will reflect approximately 96% of the radiant heat.

In addition, the barrier is non-flammable, fully breathable, and does not cause any condensation problem.

While the foregoing describes only one possible embodiment of the present invention, it is to be understood that the present invention covers all variations, modifications and changes thereof which will occur to those persons skilled in the art and to other persons after having been exposed to the present patent application.

The invention claimed is:

1. A dynamic blower system for applying shredded aluminum foil or other blowable radiant media on top of existing building insulation to form a non-flammable, fully-breathable radiant reflective barrier which reflects heat away from the insulation in summer, reflects heat back to the insulation in winter preventing heat from escaping, allows moisture to pass therethrough, and does not cause any condensation problem, comprising:
a tank into which the blowable radiant media may be loaded;
said tank having a shape of a surface of revolution;
said tank having a central axis of rotation of said surface of revolution;
an air input port interconnected with said tank for directing a stream of air to generate an air vortex in said tank, which air vortex causes said blowable radiant media to enter and spin with said vortex;
an output hose operably interconnected with an outlet port of said tank;
an internal output louver operably interconnected with said tank and positioned relative to said vortex to direct the spinning material into and through said outlet port and said output hose to enable a user to apply said blowable radiant media where desired;
multiple means for minimizing damage to said blowable radiant media in said tank, for minimizing contact of said blowable radiant media with anything, and for minimizing the time said blowable radiant media spends in said tank from said air input port to said outlet port of said tank;
a loading chute connected to and communicating with the interior said tank for loading said blowable radiant media into said tank;
said loading chute having a shape of a surface of revolution;
said loading chute having a central axis of rotation of its associated surface of revolution;
said loading chute being connected to said tank in a predetermined configuration whereby said central axis of rotation of said loading chute intersects said axis of rotation of said tank obliquely;
said loading chute being provided with a hinged lid and a latch;
said hinged lid having a viewing port therein enabling a user to determine if re-filling of said blowable radiant media into said tank is required;
said loading chute being connected to said tank at said surface of revolution of said tank near a first end of said tank;
a kickstand for supporting said tank; and
said kickstand being connected to said tank at said surface of revolution of said tank near said first end of said tank.

2. The system of claim 1, wherein:
said multiple means includes placement of said air input port and the entrance of said internal louver less than 180 degrees apart in the direction of the air vortex.

3. The system of claim 1, wherein:
said multiple means includes a high-volume air blower.

4. A dynamic blower system for applying shredded aluminum foil or other blowable radiant media on top of existing building insulation to form a non-flammable, fully-breathable radiant reflective barrier which reflects heat away from the insulation in summer, reflects heat back to the insulation in winter preventing heat from escaping, allows moisture to pass therethrough, and does not cause any condensation problem, comprising:
a tank into which the blowable radiant media may be loaded;
said tank having a shape of a surface of revolution;
said tank having a central axis of rotation of said surface of revolution;
an air input port interconnected with said tank for directing a stream of air to generate an air vortex in said tank, which air vortex causes said blowable radiant media to enter and spin with said vortex;
an output hose operably interconnected with an outlet port of said tank;
an internal output louver operably interconnected with said tank and positioned relative to said vortex to direct the spinning material into and through said outlet port and said output hose to enable a user to apply said blowable radiant media where desired;
multiple means for minimizing damage to said blowable radiant media in said tank, for minimizing contact of said blowable radiant media with anything, and for minimizing the time said blowable radiant media spends in said tank from said air input port to said outlet port of said tank;
a selectively movable air directing device operably connected with said air input port for controlling the direction the stream of air enters said tank to generate the air vortex in said tank; and
side members on said internal output louver;
and wherein:
said internal output louver is oriented in said tank so that its entrance mouth is directed downwardly;
said internal output louver having a first edge portion which is disposed substantially parallel to said central axis of rotation of said surface of revolution of said tank; and
said multiple means includes an extreme tilt of said tank whereby the air vortex and gravity enables said blowable radiant media to spend a very short time in said tank.

5. The system of claim 4, wherein:
said multiple means includes placement of said air input port and the entrance of said internal louver less than 180 degrees apart in the direction of the air vortex.

6. A dynamic blower system for applying shredded aluminum foil or other blowable radiant media on top of existing building insulation to form a non-flammable, fully-breathable radiant reflective barrier which reflects heat away from the insulation in summer, reflects heat back to the insulation in winter preventing heat from escaping, allows moisture to pass therethrough, and does not cause any condensation problem, comprising:
a tank into which the blowable radiant media may be loaded;
said tank having a shape of a surface of revolution;
said tank having a central axis of rotation of said surface of revolution;
an air input port interconnected with said tank for directing a stream of air to generate an air vortex in said tank, which air vortex causes said blowable radiant media to enter and spin with said vortex;
an output hose operably interconnected with an outlet port of said tank;
an internal output louver operably interconnected with said tank and positioned relative to said vortex to direct the spinning material into and through said outlet port and said output hose to enable a user to apply said blowable radiant media where desired;
multiple means for minimizing damage to said blowable radiant media in said tank, for minimizing contact of said blowable radiant media with anything, and for minimizing the time said blowable radiant media spends in said tank from said air input port to said outlet port of said tank;
said multiple means includes placement of said air input port and the entrance of said internal louver less than 180 degrees apart in the direction of the air vortex;
said multiple means includes a high-volume air blower;
a selectively movable air directing device operably connected with said air input port for controlling the direction the stream of air enters said tank to generate the air vortex in said tank; and
side members on said internal output louver;
and wherein:
said internal output louver is oriented in said tank so that its entrance mouth is directed downwardly;
said internal output louver having a first edge portion which is disposed substantially parallel to said central axis of rotation of said surface of revolution of said tank; and
said multiple means includes an extreme tilt of said tank whereby the air vortex and gravity enables said blowable radiant media to spend a very short time in said tank.

* * * * *